United States Patent
Xu et al.

(10) Patent No.: US 10,577,518 B2
(45) Date of Patent: Mar. 3, 2020

(54) AQUEOUS DISPERSIONS, COATING COMPOSITIONS FORMED WITH AQUEOUS DISPERSIONS, AND MULTI-LAYER COATINGS

(71) Applicant: PPG Industries Ohio, Inc., Cleveland, OH (US)

(72) Inventors: Xiangling Xu, Pittsburgh, PA (US); Hongying Zhou, Allison Park, PA (US); Richard J. Sadvary, Tarentum, PA (US); Shanti Swarup, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 137 days.

(21) Appl. No.: 15/636,687

(22) Filed: Jun. 29, 2017

(65) Prior Publication Data

US 2019/0002709 A1    Jan. 3, 2019

(51) Int. Cl.
| | |
|---|---|
| *C09D 151/08* | (2006.01) |
| *C08L 51/08* | (2006.01) |
| *C08F 290/06* | (2006.01) |
| *C09D 167/00* | (2006.01) |
| *C09D 7/65* | (2018.01) |
| *C09D 7/61* | (2018.01) |
| *C09D 7/40* | (2018.01) |
| *C09D 5/02* | (2006.01) |
| *C09D 175/04* | (2006.01) |
| *C08F 283/00* | (2006.01) |

(52) U.S. Cl.
CPC ........ *C09D 151/08* (2013.01); *C08F 283/006* (2013.01); *C08F 290/067* (2013.01); *C08L 51/08* (2013.01); *C09D 5/022* (2013.01); *C09D 7/61* (2018.01); *C09D 7/65* (2018.01); *C09D 7/70* (2018.01); *C09D 167/00* (2013.01); *C09D 175/04* (2013.01); *C08L 2201/52* (2013.01); *C08L 2201/54* (2013.01); *C08L 2207/53* (2013.01); *Y10S 525/902* (2013.01)

(58) Field of Classification Search
CPC .......................... C08G 18/3232; C09D 151/08
See application file for complete search history.

(56) References Cited

U.S. PATENT DOCUMENTS

| | | | |
|---|---|---|---|
| 4,598,121 A | 7/1986 | Disteldorf et al. | |
| 4,650,718 A | 3/1987 | Simpson et al. | |
| 4,888,383 A | 12/1989 | Huybrechts | |
| 4,933,056 A | 6/1990 | Corrigan et al. | |
| 4,983,662 A | 1/1991 | Overbeek et al. | |
| 5,141,983 A * | 8/1992 | Hasegawa ............ | C09D 151/08 524/457 |
| 5,147,926 A | 9/1992 | Meichsner et al. | |
| 5,348,997 A | 9/1994 | Kato et al. | |
| 5,472,996 A | 12/1995 | Hayashi et al. | |
| 5,530,043 A | 6/1996 | Zawacky et al. | |
| 5,571,861 A | 11/1996 | Klein et al. | |
| 5,614,582 A | 3/1997 | Hori et al. | |
| 5,623,016 A * | 4/1997 | Klein ................... | C08F 290/147 524/591 |
| 5,760,107 A | 6/1998 | Valko et al. | |
| 5,814,410 A | 9/1998 | Singer et al. | |
| 5,820,987 A | 10/1998 | Kaufman et al. | |
| 5,891,981 A | 4/1999 | Mauer et al. | |
| 5,912,293 A | 6/1999 | Stockwell et al. | |
| 6,063,861 A | 5/2000 | Irie et al. | |
| 6,239,209 B1 | 5/2001 | Yang et al. | |
| 6,455,631 B1 | 9/2002 | Blum et al. | |
| 6,555,625 B1 | 4/2003 | Overbeek et al. | |
| 6,579,932 B1 | 6/2003 | Schipper et al. | |
| 6,635,706 B1 | 10/2003 | Petschke et al. | |
| 6,706,818 B2 | 3/2004 | Ishihara et al. | |
| 6,762,240 B2 | 7/2004 | Swarup et al. | |
| 6,765,056 B2 | 7/2004 | Hobel et al. | |
| 7,476,705 B2 | 1/2009 | Pajerski | |
| 7,531,074 B2 | 5/2009 | Purdy et al. | |
| 7,576,157 B2 | 8/2009 | Pajerski | |
| 8,283,405 B2 | 10/2012 | Yukawa | |
| 8,436,084 B2 | 5/2013 | Kawaguchi et al. | |
| 8,461,253 B2 | 6/2013 | Ambrose et al. | |
| 8,846,156 B2 | 9/2014 | Swarup et al. | |
| 8,900,667 B2 | 12/2014 | Boggs et al. | |
| 8,901,244 B2 | 12/2014 | Pajerski | |
| 9,102,783 B2 | 8/2015 | Yagi et al. | |
| 9,127,125 B2 | 9/2015 | Hartig et al. | |

(Continued)

FOREIGN PATENT DOCUMENTS

| | | |
|---|---|---|
| CA | 2186776 A1 | 3/1998 |
| CA | 2219835 A1 | 5/1998 |

(Continued)

OTHER PUBLICATIONS

Abstract for CN 101569734 (Mar. 2010).*
Abstract for CN 101759841 (Jun. 2010).*
Hirose, M. et al., "The structure and properties of core-shell type acrylic-polyurethane hybrid aqueous emulsions"; Progress in Organic Coatings; May 1997; pp. 157-169; vol. 31; Elsevier Science S.A.
Li, Xiaorui et al., "Synthesis and characterization of self-crosslinked polyurethane/polyacrylate composite emulsion based on carbonyl-hydrazide reaction"; Journal of Polymer Research; Nov. 2013; pp. 1-9; vol. 20; Springer Science+Business Media Dordrecht, Netherlands.

(Continued)

*Primary Examiner* — Marc S Zimmer
(74) *Attorney, Agent, or Firm* — Justin P. Martinchek

(57) ABSTRACT

An aqueous dispersion includes an aqueous medium and self-crosslinkable core-shell particles dispersed in the aqueous medium. The core-shell particles include (1) a polymeric core at least partially encapsulated by (2) a polymeric shell having urethane linkages, keto and/or aldo functional groups, and hydrazide functional groups. Further, the polymeric core is covalently bonded to at least a portion of the polymeric shell.

33 Claims, No Drawings

(56) References Cited

U.S. PATENT DOCUMENTS

| | | | |
|---|---|---|---|
| 9,149,835 | B2 | 10/2015 | Swarup et al. |
| 9,303,181 | B2 | 4/2016 | Zhang et al. |
| 9,365,739 | B2 | 6/2016 | Dombrowski et al. |
| 10,066,116 | B2 | 9/2018 | Hibben et al. |
| 10,081,696 | B2 * | 9/2018 | Chen .................. C08G 18/672 |
| 2001/0024693 | A1 | 9/2001 | Morimoto et al. |
| 2004/0096590 | A1 | 5/2004 | Sasaki et al. |
| 2006/0121204 | A1 | 6/2006 | Nakae et al. |
| 2006/0148980 | A1 | 7/2006 | Tielemans et al. |
| 2009/0117396 | A1 | 5/2009 | Furusawa et al. |
| 2009/0137334 | A1 * | 5/2009 | Malhotra ............ A63B 69/3652 473/279 |
| 2011/0070374 | A1 | 3/2011 | Ambrose et al. |
| 2011/0300389 | A1 | 12/2011 | Kitagawa et al. |
| 2012/0021228 | A1 | 1/2012 | Kitagawa et al. |
| 2014/0377468 | A1 | 12/2014 | Swarup et al. |
| 2015/0045491 | A1 | 2/2015 | Zhang et al. |
| 2015/0307738 | A1 | 10/2015 | Schmucker et al. |
| 2016/0068706 | A1 | 3/2016 | Swarup et al. |

FOREIGN PATENT DOCUMENTS

| | | | |
|---|---|---|---|
| CN | 101240101 A | | 8/2008 |
| CN | 101569734 A | * | 3/2010 |
| CN | 102199254 A | | 9/2011 |
| CN | 102492281 A | | 6/2012 |
| JP | 5320299 A | | 12/1993 |
| JP | 5339542 A | | 12/1993 |
| JP | 782456 A | | 3/1995 |
| JP | 7188353 A | | 7/1995 |
| JP | 7242855 A | | 9/1995 |
| JP | 10139839 A | | 5/1998 |
| JP | 10259356 A | | 9/1998 |
| JP | 10265735 A | | 10/1998 |
| JP | 2000345092 A | | 12/2000 |
| JP | 200140272 A | | 2/2001 |
| JP | 200140319 A | | 2/2001 |
| JP | 2001278923 A | | 10/2001 |
| JP | 200288215 A | | 3/2002 |
| JP | 2005264136 A | | 9/2005 |
| JP | 200656973 A | | 3/2006 |
| JP | 20081779 A | | 1/2008 |
| JP | 201053340 A | | 3/2010 |
| JP | 201126463 A | | 2/2011 |
| JP | 2014129484 A | | 7/2014 |
| WO | 9747401 A1 | | 12/1997 |
| WO | 2011127641 A1 | | 10/2011 |
| WO | 2015030955 A1 | | 3/2015 |
| WO | WO 2017/158015 | * | 9/2017 |

OTHER PUBLICATIONS

Hirose et al., "The structure and properties of core-shell type acrylic-polyurethane hybrid aqueous emulsions", Progress in organic coatings, 1997, pp. 157-169, vol. 31.

Kessel et al., "The diacetone acrylamide crosslinking reaction and its influence on the film formation of an acrylic latex", Journal of Coatings Technology and Research, 2008, pp. 285-297, vol. 5, Issue 3.

Okamoto et al., "Urethane/acrylic composite polymer emulsions", Progress in organic coatings, 1996, pp. 175-182. vol. 29.

Zhang et al., "The Diacetone Acrylamide Crosslinking Reaction and Its Control of Core-Shell Polyacrylate Latices at Ambient Temperature", Journal of Applied Polymer Science, 2012, pp. 1822-1832, vol. 123.

* cited by examiner

AQUEOUS DISPERSIONS, COATING COMPOSITIONS FORMED WITH AQUEOUS DISPERSIONS, AND MULTI-LAYER COATINGS

NOTICE OF GOVERNMENT SUPPORT

This invention was made with Government support under Contract No. DE-EE0005777 awarded by the Department of Energy. The United States government may have certain rights in this invention.

FIELD OF THE INVENTION

The present invention relates to aqueous dispersions containing self-crosslinkable core-shell particles, coating composition containing the aqueous dispersions, and coatings, such as multi-layer coatings, prepared with the coating compositions.

BACKGROUND OF THE INVENTION

Coatings are applied to a wide variety of substrates to provide color and other visual effects, corrosion resistance, abrasion resistance, chemical resistance, and the like. In addition, various types of coatings, such as coatings applied to automotive substrates including vehicles and motorcycles, can be formed from compositions containing water-based dispersions such that the coatings can be baked and formed at low cure temperatures. Because these compositions can be baked at low cure temperatures, they have been found useful in forming multi-layer coatings which often include a topcoat layer applied over the basecoat layer. With respect to multi-layer coatings applied to metal substrates such as automotive substrates, a primer layer is also often applied. To shield the primer layer from ultraviolet light and provide protection against physical damage, a primer surfacer layer is separately applied over the primer layer. While the primer surfacer layer provides protective properties to the coating, the application of the primer surfacer layer requires additional coating steps and materials during the coating process.

It is accordingly an objective of the present invention to provide coating compositions that can be cured at comparatively low temperatures to form coatings having various properties and which also eliminates the need for a primer surfacer layer in multi-layer coatings, thereby reducing costs and increasing efficiency of coating processes such as in the automotive industry for example.

SUMMARY OF THE INVENTION

The present invention relates to an aqueous dispersion comprising an aqueous medium and self-crosslinkable core-shell particles dispersed in the aqueous medium. The core-shell particles comprise (1) a polymeric core at least partially encapsulated by (2) a polymeric shell comprising urethane linkages, keto and/or aldo functional groups, and hydrazide functional groups. Further, the polymeric core is covalently bonded to at least a portion of the polymeric shell.

The present invention also relates to a coating composition comprising such aqueous dispersions according to the present invention as well as substrates at least partially coated with coatings formed from such coating compositions.

The present invention further relates to a multi-layer coating comprising: a substrate; a first basecoat layer; and a second basecoat layer. The first basecoat layer is formed from a first basecoat composition comprising an aqueous medium and self-crosslinkable core-shell particles dispersed in the aqueous medium in which the core-shell particles comprise (1) a polymeric core at least partially encapsulated by (2) a polymeric shell comprising urethane linkages, keto and/or aldo functional groups, and hydrazide functional groups. The second basecoat layer is formed from a second basecoat composition comprising an aqueous medium and non-self-crosslinkable core-shell particles and a polyhydrazide dispersed in the aqueous medium in which the non-self-crosslinkable core-shell particles comprise (1) a polymeric core comprising keto and/or aldo functional groups that is at least partially encapsulated by (2) a polymeric shell comprising urethane linkages. Further, the polymeric core of the core-shell particles of the first basecoat composition and the second basecoat composition are each independently covalently bonded to at least a portion of the polymeric shell of the core-shell particles. In addition, (i) the first basecoat layer is formed over at least a portion of the substrate and the second basecoat layer is formed over at least a portion of the first basecoat layer, or (ii) the second basecoat layer is formed over at least a portion of the substrate and the first basecoat layer is formed over at least a portion of the second basecoat layer.

DESCRIPTION OF THE INVENTION

The present invention is directed to an aqueous dispersion comprising an aqueous medium and self-crosslinkable core-shell particles dispersed in the aqueous medium. As used herein, an "aqueous medium" refers to a liquid medium comprising at least 50 weight % water, based on the total weight of the liquid medium. Such aqueous liquid mediums can for example comprise at least 60 weight % water, or at least 70 weight % water, or at least 80 weight % water, or at least 90 weight % water, or at least 95 weight % water, or 100 weight % water, based on the total weight of the liquid medium. The solvents that, if present, make up less than 50 weight % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

Further, the term "self-crosslinkable" refers to a polymeric particle having two or more functional groups that are reactive with each other and which participate in intramolecular and/or intermolecular crosslinking reactions to form a covalent linkage in the absence of any external crosslinking agent. For example, the polymeric particles of the present invention can each comprise hydrazide functional groups as well as a keto and/or aldo functional groups that can react with each other to yield hydrazone linkages. As used herein, a "crosslinking agent", "crosslinker", and like terms refers to a molecule comprising two or more functional groups that are reactive with other functional groups and which is capable of linking two or more monomers or polymer molecules through chemical bonds. It is appreciated that the self-crosslinkable core-shell particles can also react with separate crosslinking agents when present.

The aqueous dispersed core-shell particles of the present invention comprise a core that is at least partially encapsulated by the shell. A core-shell particle in which the core is at least partially encapsulated by the shell refers to a particle comprising (i) at least a first material or materials that form the center of the particle (i.e., the core) and (ii) at least a second material or materials (i.e., the shell) that form a layer over at least a portion of the surface of the first material(s) (i.e., the core). It is appreciated that the first material(s) that forms the core is different from the second material(s) that forms the shell. Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size can for example be determined with a Zetasize 3000HS following the instructions in the Zetasize 3000HS manual.

The polymeric core typically comprises an addition polymer derived from ethylenically unsaturated monomers. The ethylenically unsaturated monomers can comprise a (meth)acrylate monomer, a vinyl monomer, or a combination thereof. As such, the polymeric core can comprise a (meth)acrylate polymer, a vinyl polymer, or a combination thereof. As used herein, the term "(meth)acrylate" refers to both the methacrylate and the acrylate. Moreover, the backbone, or main chain, of a polymer or polymers that form at least a portion of the polymeric shell can comprise urea linkages and/or urethane linkages and may optionally further comprise other linkages. For instance, the polymeric shell can comprise a polyurethane with a backbone that includes urethane linkages and urea linkages. As indicated, the polymeric shell can also comprise additional linkages including, but not limited to, ester linkages, ether linkages, and combinations thereof.

The polymeric core and/or polymeric shell can also comprise one or more, such as two or more, reactive functional groups. The term "reactive functional group" refers to an atom, group of atoms, functionality, or group having sufficient reactivity to form at least one covalent bond with another co-reactive group in a chemical reaction. At least some of the reactive functional groups of the polymeric shell are keto functional groups (also referred to as ketone functional groups) and/or aldo functional groups (also referred to as aldehyde functional groups) as well as hydrazide functional groups. Optionally, the polymeric core also comprises reactive functional groups such as keto functional groups, aldo functional groups, or combinations thereof. Alternatively, the polymer core is free of reactive functional groups such as keto functional groups and aldo functional groups.

Other non-limiting examples of additional reactive functional groups that can be present on the polymeric shell and/or the polymeric core include carboxylic acid groups, amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. It is appreciated that the polymeric shell, polymeric core, or both, can be free of (i.e., does not contain) any of the additional reactive functional groups.

The polymeric core and polymeric shell of the core-shell particles can be prepared to provide a hydrophilic polymeric shell with enhanced water-dispersibility/stability and a hydrophobic polymeric core. As used herein, the term "hydrophilic" refers to polymers, monomers, and other materials that have an affinity for water and which will disperse or dissolve in water or other aqueous based mediums. Hydrophilic materials, such as hydrophilic polymers, typically have water-dispersible groups. A "water-dispersible group" refers to a group having or formed from one or more hydrophilic functional groups that have an affinity for water and which help disperse a compound, such as a polymer, in water or other aqueous based mediums. Further, as used herein, the term "hydrophobic" refers to polymers, monomers, and other materials that lack an affinity for water or other aqueous based mediums and tend to repel, not dissolve or disperse in, and/or not be wetted by water or other aqueous based mediums. Hydrophobic materials, such as hydrophobic polymers, are often free of water-dispersible groups.

As indicated, the polymeric core and polymeric shell of the core-shell particles can be prepared to provide a hydrophilic polymeric shell with enhanced water-dispersibility/stability and a hydrophobic polymeric core. Thus, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in the aqueous medium so that the polymeric shell at least partially encapsulates the hydrophobic core.

As previously described, the water-dispersible groups comprise one or more hydrophilic functional groups. For example, the polymer(s) that form the hydrophilic polymeric shell can comprise ionic or ionizable groups such as acid groups like carboxylic acid functional groups or salts thereof. Carboxylic acid functional group could for example be introduced by using a carboxylic acid group containing diol to form the polymeric shell. The acid groups such as carboxylic acid functional groups can be at least partially neutralized (i.e., at least 30% of the total neutralization equivalent) by an inorganic base, such as a volatile amine, to form a salt group. A volatile amine refers as an amine compound having an initial boiling point of less than or equal to 250° C. as measured at a standard atmospheric pressure of 101.3 kPa. Examples of suitable volatile amines are ammonia, dimethylamine, trimethylamine, monoethanolamine, and dimethylethanolamine. It is appreciated that the amines will evaporate during the formation of the coating to expose the acid groups such as carboxylic acid functional groups and allow the acid groups such as carboxylic acid functional groups to undergo further reactions such as with a crosslinking agent reactive with the acid groups or carboxylic acid functional groups. Other non-limiting examples of water-dispersible groups include polyoxyalkylene groups such as by using polyethylene/propylene glycol ether materials for example.

In some examples, the polymeric shell is formed from (i) polyurethanes comprising pendant and/or terminal keto and/or aldo functional groups as well as pendant and/or terminal carboxylic acid functional groups, and (ii) polyurethanes comprising pendant and/or terminal hydrazide functional groups as well as pendant and/or terminal carboxylic acid functional groups. As previously described, the carboxylic acid functional groups can be at least partially neutralized (i.e., at least 30 of the total neutralization equivalent) by an inorganic base, such as a volatile amine, to form a salt group as previously described. Further, the polymeric core can be a hydrophobic core that is free of such carboxylic acid groups and salt groups formed therefrom. A "pendant group"

refers to a group that is an offshoot from the side of the polymer backbone and which is not part of the polymer backbone. In contrast, a "terminal group" refers to a group on an end of the polymer backbone and which is part of the polymer backbone.

The polymeric shell is also covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

Various components can be used to form the core-shell particles of the present invention. For example, the core-shell particles can be formed from isocyanate functional polyurethane prepolymers, polyamines, hydrazide functional compounds, and ethylenically unsaturated monomers. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, hydrazide groups, and acid groups like carboxylic acid groups. A hydroxyl group may, for example, react with an isocyanate group to form a urethane linkage. A primary or secondary amine group may react with an isocyanate group to form a urea linkage. Examples of suitable compounds that can be used to form the polyurethane include, but are not limited to, polyols, polyisocyanates, compounds containing one or more carboxylic acid groups, such as diols containing one or more carboxylic acid groups, polyamines, hydroxyl functional ethylenically unsaturated components, such as hydroxyalkyl esters of (meth)acrylic acid, and/or other compounds having reactive functional groups, such as hydroxyl groups, thiol groups, amine groups, and carboxylic acid groups. The polyurethane prepolymer can also be prepared with keto and/or aldo functional monoalcohols.

Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

Examples of polyols that can be used to prepare a polyurethane based polymer such as the polyurethane prepolymer include, but are not limited to, lower molecular weight glycols, polyether polyols, polyester polyols, copolymers thereof, and combinations thereof. Non-limiting examples of low molecular weight glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols include polytetrahydrofuran, polyethylene glycol, polypropylene glycol, polybutylene glycol, and combinations thereof. Non-limiting examples of polyester polyols include those prepared from a polyol comprising an ether moiety and a carboxylic acid or anhydride.

Other suitable polyols include, but are not limited to, cyclohexanedimethanol, 2-ethyl-1,6-hexanediol, 1,3-propanediol, 1,4-butanediol, neopentyl glycol, trimethylol propane, 1,2,6-hexantriol, glycerol, and combinations thereof. Further, suitable amino alcohols that can be used include, but are not limited to, ethanolamine, propanolamine, butanolamine, and combinations thereof.

Suitable carboxylic acids, which can be reacted with the polyols to form a polyester polyol, include, but are not limited to, diacids such as glutaric acid, succinic acid, malonic acid, oxalic acid, phthalic acid, isophthalic acid, hexahydrophthalic acid, adipic acid, maleic acid, and mixtures thereof. Further, non-limiting examples of acid containing diols include, but are not limited to, 2,2-bis(hydroxymethyl)propionic acid, which is also referred to as dimethylolpropionic acid (DMPA), 2,2-bis(hydroxymethyl) butyric acid, which is also referred to as dimethylol butanoic acid (DMBA), diphenolic acid, and combinations thereof.

Non-limiting examples of hydrazide functional materials that can be used in the preparation of the polyurethane prepolymer and to provide hydrazide functionality include dihydrazide functional compounds such as, but not limited to, maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic acid dihydrazide, sebacic dihydrazide, and combinations thereof.

Examples of keto functional monoalcohols that can be used in the preparation of the polyurethane prepolymer and to provide keto and/or aldo functionality include, but are not limited to, hydroxyacetone, 4-hydroxy-2-butanone, 5-hydroxy-4-octanone, 4-hydroxy-4-methylpentan-2-one, which is also referred to as diacetone alcohol, 3-hydroxyacetophenone, and combinations thereof. Further, non-limiting examples of aldo functional monoalcohols include D-Lactaldehyde solution, 3-hydroxy-butanal, 4-hydroxy-pentanal, 5-hydroxy-hexanal, 5-hydroxy-5-methylhexanal, 4-hydroxy-4-methyl-pentanal, 3-hydroxy-3-methylbutanal, and combinations thereof.

Non-limiting examples of compounds, which can be used to incorporate ethylenically unsaturated moieties to the polyurethane prepolymer, include hydroxyalkyl esters of (meth)acrylic acid such as hydroxymethyl (meth)acrylate, hydroxyethyl (meth)acrylate, hydroxypropyl (meth)acrylate, hydroxybutyl (meth)acrylate, and combinations thereof.

The components that form the polyurethane prepolymer can be reacted in a stepwise manner, or they can be reacted simultaneously. For example, the polyurethane prepolymer can be formed by reacting a diisocyanate, a polyol, a carboxyl group-containing diol, a hydroxyl group-containing ethylenically unsaturated monomer, and a dihydrazide functional compound.

As previously mentioned, the core-shell particles can also be prepared with polyamines and ethylenically unsaturated monomers not incorporated into the polyurethane during preparation thereof. For instance, the isocyanate functional polyurethane prepolymers can be prepared as described above and then reacted with polyamines as a chain extender. As used herein, a "chain extender" refers to a lower molecular weight compound having two or more functional groups that are reactive towards isocyanate.

Suitable polyamines that can be used to prepare the polyurethane based polymer include aliphatic and aromatic compounds, which comprise two or more amine groups selected from primary and secondary amine groups. Examples include, but are not limited to, diamines such as, for example, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations thereof. Suitable polyamines are also sold by Huntsman under the trade name JEFFAMINE®, such as JEFFAMINE® D-230 and JEFFAMINE® D-400.

Other non-limiting examples of suitable polyamine functional compounds include the Michael addition reaction products of a polyamine functional compound, such as a diamine, with keto and/or aldo containing ethylenically unsaturated monomers. The polyamine functional compound typically comprises at least two primary amino groups (i.e., a functional group represented by the structural formula —NH2), and the keto and/or aldo containing unsaturated monomers include, but are not limited to, (meth) acrolein, diacetone (meth)acrylamide, diacetone (meth) acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula —NRH in which R is a hydrocarbon) and at least two keto and/or aldo functional groups. It is appreciated that the secondary amino groups will react with the isocyanate functional groups of the polyurethane prepolymers to form urea linkages and chain extend the polyurethanes. Further, the keto and/or aldo functional groups will extend out from the backbone of the chain-extended polyurethane, such as from the nitrogen atom of the urea linkage, for example, to form a polyurethane with pendant keto and/or aldo functional groups.

As indicated, and in accordance with the present invention, the aqueous dispersion includes core-shell particles that have a polymeric shell comprising keto and/or aldo functional groups as well as hydrazide functional groups. The polymeric shell of such core-shell particles can be prepared with hydrazide functional polymers and keto and/or aldo functional polymers or polymers that contain both hydrazide functionality and keto and/or aldo functionality. The polymers can also include additional functional groups as previously described including, but not limited to, ethylenically unsaturated groups. For example, the polymeric shell of such core-shell particles can be prepared with: (i) a first polyurethane comprising urethane linkages, water-dispersible groups such as carboxylic acid groups, ethylenically unsaturated groups, and hydrazide groups; and (ii) a second polyurethane comprising urethane linkages, water-dispersible groups such as carboxylic acid groups, ethylenically unsaturated groups, keto and/or aldo groups, and, optionally, urea linkages.

Moreover, the first and second polyurethanes can be prepared with the previously described components. For instance, the first polyurethane can be prepared by reacting an isocyanate and ethylenically unsaturated functional polyurethane with a dihydrazide functional compound such as adipic acid dihydrazide. The second polyurethane can be prepared, for example, by reacting and chain extending isocyanate and ethylenically unsaturated functional polyurethanes with the Michael addition reaction product of a diamine and keto and/or aldo containing ethylenically unsaturated monomers. The isocyanate and ethylenically unsaturated functional polyurethanes used to form the first and second polyurethanes can be formed from polyols, polyisocyanates, diols containing carboxylic acid functionality, and hydroxyl functional ethylenically unsaturated components.

After forming the polyurethane(s) (for example, the first and second polyurethanes previously described), the polyurethane(s) and additional ethylenically unsaturated monomers can be subjected to a polymerization process to form the core-shell particles. The additional ethylenically unsaturated monomers can be added after forming the polyurethane(s). Alternatively, the additional ethylenically unsaturated monomers can be used as a diluent during preparation of the polyurethane(s) and not added after formation of the polyurethane(s). It is appreciated that ethylenically unsaturated monomers can be used as a diluent during preparation of the polyurethane(s) and also added after formation of the polyurethane(s).

The additional ethylenically unsaturated monomers can comprise multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Non-limiting examples of ethylenically unsaturated monomers include, but are not limited to, alkyl esters of (meth)acrylic acid, hydroxyalkyl esters of (meth)acrylic acid, acid group containing ethylenically unsaturated monomers, vinyl aromatic monomers, aldo or keto containing ethylenically unsaturated monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth) acrylic acid and keto and aldo containing ethylenically unsaturated monomers include any of those previously described. Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers, such as divinyl benzene, and combinations thereof.

As previously noted, the ethylenically unsaturated monomers can be polymerized in the presence of the polyurethane(s), which can also contain ethylenically unsaturated groups, to form the core-shell particles. The polymerization can be conducted using art recognized techniques as well as conventional additives such as emulsifiers, protective colloids, free radical initiators, and chain transfer agents known in the art.

Thus, in some examples, the core-shell particles of the present invention are prepared with: (i) ethylenically unsaturated monomers; (ii) a first polyurethane comprising urethane linkages, carboxylic acid groups, ethylenically unsaturated groups, and hydrazide groups; and (iii) a second polyurethane comprising urethane linkages, urea linkages, carboxylic acid groups, ethylenically unsaturated groups, and keto and/or aldo groups. The resulting core-shell particles then comprise a polymeric core prepared from ethylenically unsaturated monomers, thus for example comprising an addition polymer formed by free radical polymerization from a monomer component that may comprise any of the ethylenically unsaturated monomers previously mentioned, that is covalently bonded to at least a portion of a polyurethane shell having pendant carboxylic acid functional groups, pendant or terminal keto and/or aldo functional groups, hydrazide functional groups, urethane linkages, and urea linkages. For enhanced water-dispersibility/stability, the carboxylic acid functional groups on the polymeric shell can be at least partially neutralized (i.e., at least 30 of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers that contain additional functional groups such as acid group containing ethylenically unsaturated monomers and/or aldo or keto containing ethylenically unsaturated monomers as indicated above. Alternatively, the polymeric core can be free of additional functional groups such as free of keto and/or aldo functional groups. Further, the polymeric core is covalently bonded to at least a portion of the polymeric shell after polymerization of the monomers and polyurethane(s).

It is appreciated that the core-shell particles described herein are dispersed in the aqueous medium to form a latex. As used herein, a "latex", with respect to the aqueous dispersed core-shell particles, refers to an aqueous colloidal dispersion of polymeric particles.

The present invention is also directed to a coating composition comprising the previously described aqueous medium of self-crosslinkable core-shell particles. The self-crosslinkable core-shell particles can comprise at least 10 weight %, at least 20 weight %, at least 30 weight %, or at least 40 weight % of the coating composition, based on the total solids weight of the coating composition. The self-crosslinkable core-shell particles can comprise up to 90 weight %, up to 80 weight %, up to 70 weight %, up to 60 weight %, or up to 50 weight % of the coating composition, based on the total solids weight of the coating composition. The self-crosslinkable core-shell particles can also comprise a range such as from 10 to 90 weight %, or from 10 to 80 weight %, or from 20 to 60 weight %, or from 20 to 50 weight % of the coating composition, based on the total solids weight of the coating composition.

The coating composition may optionally also comprise additional components. For example, the coating composition can also comprise non-self-crosslinkable core-shell particles. As used herein, "non-self-crosslinkable" refers to a polymeric particle having one or more functional groups that are not reactive with each other and which thus requires one or more external crosslinking agents to undergo a crosslinking reaction. The non-self-crosslinkable core-shell particles can for example include a polymeric core comprising: (i) residues from ethylenically unsaturated monomers such as (meth)acrylate monomers, vinyl monomers, or a combination thereof and therefore comprise an addition polymer such as a (meth)acrylate polymer, a vinyl polymer, or a combination thereof; and (ii) keto and/or aldo functional groups. Moreover, the backbone or main chain of the polymer(s) that forms at least a portion of the polymeric shell can comprise urethane linkages and, optionally, other linkages such as for example ester linkages, ether linkages, and combinations thereof. Thus, the polymeric core can comprise keto and/or aldo functional groups, and the polymeric shell can comprise a polyurethane(s) that is free of keto and/or aldo functional groups and, optionally, free of urea linkages. Further, both the polymeric core and the polymeric shell may be free of hydrazide functional groups. It is appreciated that such non-self-crosslinkable core-shell particles can be prepared with similar materials as described above with respect to the self-crosslinkable core-shell particles.

The non-self-crosslinkable core-shell particles can also include a polymeric core comprising an addition polymer such as a (meth)acrylate polymer, a vinyl polymer, or a combination thereof that is derived from ethylenically unsaturated monomers such as (meth)acrylate monomers, vinyl monomers, or a combination thereof, and a polymeric shell comprising urethane linkages, water-dispersible groups such as carboxylic acid groups, ethylenically unsaturated groups, keto and/or aldo groups, and, optionally, urea linkages. Moreover, the backbone or main chain of the polymer(s) that forms at least a portion of the polymeric shell can, optionally, comprise other linkages such as ester linkages, ether linkages, and combinations thereof. The resulting core-shell particles then comprise a polymeric core prepared from ethylenically unsaturated monomers that is covalently bonded to at least a portion of a polyurethane shell having pendant carboxylic acid functional groups, pendant or terminal keto and/or aldo functional groups, urethane linkages, and, optionally, urea linkages. For enhanced water-dispersibility/stability, the carboxylic acid functional groups on the polymeric shell can be at least partially neutralized (i.e., at least 30% of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers that contain additional functional groups as discussed above with respect to the self-crosslinkable core-shell particles. Alternatively, the polymeric core can be free of additional functional groups such as keto and/or aldo functional groups. Further, both the polymeric core and the polymeric shell can be free of hydrazide functional groups. It is appreciated that such core-shell particles can be prepared with similar materials as described above with respect to the self-crosslinkable core-shell particles.

The non-self-crosslinkable core-shell particles can comprise at least 0.1 weight %, at least 1 weight %, at least 2 weight %, at least 5 weight %, or at least 10 weight % of the coating composition, based on the total solids weight of the coating composition. The non-self-crosslinkable core-shell particles can comprise up to 50 weight %, up to 40 weight %, up to 30 weight %, or up to 20 weight % of the coating composition, based on the total solids weight of the coating composition. The non-self-crosslinkable core-shell particles can also comprise a range such as from 0.1 to 50 weight %, or from 1 to 30 weight %, or from 2 to 20 weight % of the coating composition, based on the total solids weight of the coating composition.

The coating composition can also comprise one or more crosslinkers. For instance, the coating composition according to the present invention may comprise at least one crosslinker that is reactive with the functionality on the non-self crosslinkable core-shell particles described above and/or the optional additional film-forming resins further described herein. Non-limiting examples of crosslinkers include polyhydrazides, carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyacids, anhydrides, organometallic acid-functional materials, polyamines, polyamides, aminoplasts, aziridines, and combinations thereof.

The crosslinker(s) can react with the core-shell particles to help cure the coating composition. The terms "curable", "cure", and the like, mean that at least a portion of the resinous materials in a composition is crosslinked or crosslinkable. Cure, or the degree of cure, can be determined by dynamic mechanical thermal analysis (DMTA) using a Polymer Laboratories MK III DMTA analyzer conducted under nitrogen. The degree of cure can for example be at least 10%, such as at least 30%, such as at least 50%, such as at least 70%, or at least 90% of complete crosslinking as determined by the analysis mentioned above.

Further, curing can occur at ambient conditions, with heat, or with other means such as actinic radiation. "Ambient conditions" as used herein refers to the conditions of the surrounding environment such as the temperature, humidity, and pressure of the room or outdoor environment. For example, the coating composition can be cured at ambient room temperature (e.g. 20° C.). Further, the term "actinic radiation" refers to electromagnetic radiation that can initiate chemical reactions. Actinic radiation includes, but is not limited to, visible light, ultraviolet (UV) light, infrared and near-infrared radiation, X-ray, and gamma radiation.

The coating composition can comprise at least one crosslinker that is reactive with: (i) the keto and/or aldo functional groups or the hydrazide functional groups on the polymeric shell of the self-crosslinkable core-shell particles; and/or (ii) the keto and aldo functional groups on the polymeric core and/or shell of the non-self-crosslinkable core-shell particles when present. The crosslinker can also react with functional groups such as keto and aldo functional groups that can be present on the polymeric core of the self-crosslinkable core-shell particles. For instance, the coating composition can comprise a polyhydrazide that is reactive with the keto and/or aldo functional groups on the polymeric shell of the non-self-crosslinkable core-shell particles and keto and/or aldo functional groups on the polymeric shell of the self-crosslinkable core-shell particles. The polyhydrazides can include non-polymeric polyhydrazides, polymeric polyhydrazides, or combinations thereof. Non-limiting examples of suitable non-polymeric polyhydrazides include the dihydrazide functional compounds previously described.

The polymeric polyhydrazides can include various types of polymers comprising two or more hydrazide functional groups. For example, the polymeric polyhydrazide can comprise a polyurethane having two or more hydrazide groups. The polyhydrazide functional polyurethane can be prepared by first forming a water-dispersible isocyanate functional polyurethane prepolymer. Such water-dispersible isocyanate functional polyurethane prepolymers can for example be prepared by reacting polyols, isocyanates, and, optionally, compounds containing carboxylic acids such as diols containing carboxylic acid groups, and/or polyamines. Non-limiting examples of these compounds include any of those previously described with respect to the polyurethane prepolymer of the core-shell particles.

It is appreciated that the isocyanate functional polyurethane prepolymer used to prepare the polyhydrazide functional polyurethane can include additional functional groups. For instance, the isocyanate functional polyurethane prepolymer can also include any of the reactive functional groups previously described such as carboxylic acid groups that can be at least partially neutralized by an inorganic base to form a salt group and enhance the water-dispersibility/stability of the polyurethane. The polyurethane prepolymer can also be free of any of the additional functional groups. Further, the isocyanate functional polyurethane prepolymer can include additional linkages other than urethanes including, but not limited to, ether linkages, ester linkages, urea linkages, and any combination thereof.

After forming the water-dispersible isocyanate functional polyurethane prepolymer, the polyurethane prepolymer is reacted with one or more hydrazine and/or polyhydrazide compound(s) to form a water-dispersible polyhydrazide functional polyurethane. The hydrazine and polyhydrazide compounds can also chain extend the isocyanate functional polyurethane prepolymer. Non-limiting examples of polyhydrazide compounds that can be reacted with the isocyanate functional polyurethane prepolymer include any of the non-polymeric hydrazide functional compounds previously described.

The polymeric polyhydrazides can also comprise core-shell particles comprising a polymeric core at least partially encapsulated by a polymeric shell having two or more hydrazide functional groups. The polyhydrazide functional core-shell particles can be prepared by reacting polyurethane prepolymers having isocyanate and ethylenically unsaturated functional groups with hydrazine and/or polyhydrazide compounds and ethylenically unsaturated monomers and/or polymers. In some examples, the polyhydrazide functional core-shell particles are prepared by reacting polyurethane prepolymers having isocyanate and ethylenically unsaturated groups with hydrazine and/or polyhydrazide compounds to form polyurethanes having hydrazide and ethylenically unsaturated groups. The polyurethanes having hydrazide and ethylenically unsaturated groups are then polymerized in the presence of ethylenically unsaturated monomers and/or polymers to form the core-shell particles. The resulting core-shell particles will comprise a polymeric core prepared from ethylenically unsaturated monomers and/or polymers that are covalently bonded to at least a portion of a polyurethane shell having hydrazide functional groups and urethane linkages. The polymeric shell can also comprise additional functional groups (for example, carboxylic acid functional groups) and/or linkages (for example, ester linkages and/or ether linkages) as previously described with respect to polyurethane shells. The hydrazide functional core-shell particles can be also free of additional functional groups and linkages such as any of those previously described herein. It is appreciated that the hydrazide functional core-shell particles that can be used as a crosslinker are free of keto and aldo functional groups.

The coating composition can also comprise at least two different types of crosslinkers that are reactive with the functional groups that may be present on the core-shell particles such as keto and/or aldo functional groups, hydrazide groups and/or carboxylic acid functional groups. In some examples, the coating composition comprises a polyhydrazide reactive with the keto and/or aldo functional group, such as any of those previously described, and a carbodiimide reactive with carboxylic acid functional groups. Non-limiting examples of suitable carbodiimides are described in U.S. Patent Application Publication No. 2011/0070374 at paragraphs [0006] to [0105], which is incorporated by reference herein.

In addition, the coating composition can comprise additional materials including, but not limited to, additional resins such as additional film-forming resins. As used herein, a "film-forming resin" refers to a resin that when used in a coating composition can form a self-supporting continuous film on at least a horizontal surface through dehydration and/or upon curing. The term "dehydration" refers to the removal of water and/or other solvents. It is appreciated that dehydration can also cause at least partial curing of a resinous material such as the core-shell particles and additional resins described herein. The coating composition comprising the additional resin can be dehydrated and/or cured at ambient conditions, with heat, or with other means such as actinic radiation as previously described.

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Non-limiting examples of suitable additional resins include polyurethanes other than those previously described, polyesters such as polyester polyols, polyamides, polyethers, polysiloxanes, fluoropolymers, polysulfides, polythioethers, polyureas, (meth)acrylic resins, epoxy resins, vinyl resins, and combinations thereof. The additional resins can also include non-particulate resins.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. The crosslinkers can include any of those previously described. Alternatively, a thermosetting film-forming resin can be used having functional groups that are reactive with themselves; in this manner, such thermosetting resins are self-crosslinking.

The coating composition can also include other additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, and bismuth vanadate.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

The colorant which can be used with the coating composition of the present invention can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

Other non-limiting examples of further materials that can optionally be used with the coating composition of the present invention include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

The coating composition can be deposited directly over at least a portion of a substrate or directly over at least a portion of an optional primer coating layer, which is explained in further detail herein, and, optionally, dehydrated and/or cured to form a coating layer such as a basecoat layer. A "basecoat layer" refers to a coating layer that is deposited onto a primer and/or directly onto a substrate, optionally including components (such as pigments) that impact the color and/or provide other visual impact. Further, a "primer coating layer" refers to an undercoating that may be deposited onto a substrate in order to prepare the surface for application of a protective or decorative coating system.

The coating composition can be applied to a wide range of substrates known in the coatings industry. For example, the coating composition can be applied to automotive substrates, industrial substrates, aerocraft and aerocraft substrates and components, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather, both synthetic and natural, and the like. The substrate can be one that has been already treated in some manner, such as to impart visual and/or color effect, a protective pretreatment or other coating layer, and the like.

The coating composition of the present invention is particularly beneficial when applied to a metallic substrate. For example, the coatings of the present invention are particularly beneficial when applied to metallic substrates that are used to fabricate automotive vehicles, such as cars, trucks, and tractors.

The coating composition can be applied directly over at least a portion of the substrate or a primer coating layer by any means standard in the art, such as spraying, electrostatic spraying, dipping, rolling, brushing, and the like. Once applied, the composition can be dehydrated and/or cured to form the coating layer. The coating composition can be dehydrated and/or cured at ambient temperatures (e.g. 20° C.) to 140° C., or from ambient temperatures to 120° C., or from ambient temperatures to 100° C., or from ambient temperatures to 90° C., or from 40° C. to 80° C., or from 50° C. to 80° C.

It was found that the coatings of the present invention can be formed at lower dehydration/cure temperatures than those typically required in other coatings commonly applied to automotive substrates. As such, the coatings of the present invention, including the multi-layer coatings further described herein, help reduce costs and speed up the overall coating process.

As indicated, the present invention also relates to a multi-layer coating that comprises at least a first basecoat layer and a second basecoat layer. As explained in further detail herein, the multi-layer coating can include additional coating layers including, but not limited to, a primer layer, a topcoat layer, or a combination thereof. A "topcoat" refers to an uppermost coating that is deposited over another coating layer such as a basecoat to provide a protective and/or decorative layer.

The first basecoat layer of the multi-layer coating is formed from the previously described coating composition that comprises aqueous dispersed self-crosslinkable core-shell particles. The coating composition used to form the first basecoat layer can also include one or more of the previously described non-self-crosslinkable core-shell particles, additional film-forming resins, crosslinkers, colorants, and/or other optional materials. For example, the first basecoat composition can include, without being limited thereto, self-crosslinkable core-shell particles, non-self-crosslinkable core-shell particles, a polyhydrazide and a carbodiimide that are reactive with at least the non-self-crosslinkable core-shell particles and/or the self-crosslinkable core-shell particles, a polyester polyol, and at least one colorant.

As previously described, the multi-layer coating also includes a second basecoat layer. The second basecoat layer of the multi-layer coating described herein can be formed from a coating composition that comprises an aqueous medium and non-self-crosslinkable core-shell particles dispersed in the aqueous medium. The aqueous dispersed non-self-crosslinkable core-shell particles can comprise any of the non-self-crosslinkable core-shell particles previously described. For example, the second basecoat composition can include non-self-crosslinkable core-shell particles with a polymeric core comprising: (i) residues from ethylenically unsaturated monomers such as (meth)acrylate monomers, vinyl monomers, or a combination thereof; and (ii) keto and/or aldo functional groups. Moreover, the backbone or main chain of the polymer(s) that forms at least a portion of the polymeric shell can comprise urethane linkages and, optionally, other linkages such as ester linkages, ether linkages, and combinations thereof. The second basecoat composition can also comprise the previously described self-crosslinkable core-shell particles. Alternatively, the second basecoat composition can be completely free of self-crosslinkable core-shell particles.

The second basecoat composition can also comprise any of the previously described additional resins, crosslinkers, colorants, and/or other optional materials. For example, the second basecoat composition can further comprise a polyhydrazide crosslinker reactive with keto and/or aldo functional groups of at least the non-self-crosslinkable core-shell particles, and/or a carbodiimide crosslinker reactive with carboxylic acid functional groups of at least the non-self-crosslinkable core-shell particles, and colorants. Further, in some examples, the second basecoat composition can comprise special effect pigments and the first basecoat composition can be free of special effect pigments. As such, the first basecoat composition can for example only comprise pigments that impart a continuous unchanging color and the second basecoat layer can for example only comprise special effect pigments. Alternatively, the first basecoat composition can comprise special effect pigments and the second basecoat composition can be free of special effect pigments. As such, the second basecoat composition can for example only comprise pigments that impart a continuous unchanging color and the first basecoat layer can for example only comprise special effect pigments.

The first basecoat composition or the second basecoat composition can be applied directly over at least a portion of the substrate by any means standard in the art, such as spraying, electrostatic spraying, dipping, rolling, brushing, and the like. Once applied, the composition can be dehydrated and/or cured to form a basecoat layer. The coating composition can be dehydrated and/or cured at ambient temperatures (e.g. 20° C.) to 140° C., or from ambient temperatures to 120° C., or from ambient temperatures to 100° C., or from ambient temperatures to 90° C., or from 40° C. to 80° C., or from 50° C. to 80° C.

When the first basecoat composition is applied directly over at least a portion of the substrate, the second basecoat composition can be applied directly over at least a portion of the first basecoat composition as a wet-on-wet process, (i.e. prior to dehydration of the first basecoat composition). The second basecoat composition can be applied by any means standard in the art, such as spraying, electrostatic spraying, dipping, rolling, brushing, and the like. After the second basecoat composition is applied, both basecoat compositions can be dehydrated and/or cured simultaneously. Both basecoat compositions can be dehydrated and/or cured simultaneously at ambient temperatures (e.g. 20° C.) to 140° C., or from ambient temperatures to 120° C., or from ambient temperatures to 100° C., or from ambient temperatures to 90° C., or from 40° C. to 80° C., or from 50° C. to 80° C.

The second basecoat composition can also be applied directly over at least a portion of the dehydrated and/or cured first basecoat layer. The second basecoat composition can then be dehydrated and/or cured at ambient temperatures (about 20° C. to 25° C.) to 140° C., or from ambient temperatures to 120° C., or from ambient temperatures to 100° C., or from ambient temperatures to 90° C., or from 40° C. to 80° C., or from 50° C. to 80° C.

Alternatively, when the second basecoat composition is applied directly over at least a portion of the substrate, the first basecoat composition can be applied directly over at least a portion of the second basecoat composition as a wet-on-wet process, (i.e. prior to dehydration of the second basecoat composition). After the first basecoat composition is applied, both basecoat compositions can be dehydrated and/or cured simultaneously. Both basecoat compositions can be dehydrated and/or cured simultaneously at ambient temperatures (e.g. 20° C.) to 140° C., or from ambient temperatures to 120° C., or from ambient temperatures to 100° C., or from ambient temperatures to 90° C., or from 40° C. to 80° C., or from 50° C. to 80° C.

The first basecoat composition can also be applied directly over at least a portion of the dehydrated and/or cured second basecoat layer. The first basecoat composition can then be dehydrated and/or cured at ambient temperatures (about 20° C. to 25° C.) to 140° C., or from ambient temperatures to 120° C., or from ambient temperatures to 100° C., or from ambient temperatures to 90° C., or from 40° C. to 80° C., or from 50° C. to 80° C.

In some examples, the first basecoat composition is applied directly over at least a portion of the substrate and the second basecoat composition is applied directly over at least a portion of the first basecoat composition or the dehydrated and/or cured the first basecoat layer. In such examples, the second basecoat layer can provide additional coating thickness and coating properties (e.g. special optical effects) without undesirable flow obtained when using a single layer to achieve the same result.

After the basecoat layers have been dehydrated and/or cured, a topcoat layer can optionally be applied over at least a portion of the first or second basecoat layer. For example, the first basecoat layer can be formed over the substrate, the second basecoat layer can be formed over the first basecoat layer, and the topcoat layer can be formed over the second basecoat layer. The topcoat layer can optionally be formed from a coating composition that comprises a film-forming resin, a crosslinker, an aqueous or non-aqueous solvent medium, and/or any of the other materials such as those previously described. In comparison to an aqueous medium, a "non-aqueous medium" comprises less than 50 weight % water, or less than 40 weight % water, or less than 30 weight % water, or less than 20 weight % water, or less than 10 weight % water, or less than 5 weight % water, based on the total weight of the liquid medium. The solvents that make up 50 weight % or more of the liquid medium can include, but are not limited to, any of the organic solvents previously described. Conditions used to cure the topcoat layer are dependent on the components in the topcoat composition. For instance, the topcoat composition can comprise components that will cure at a temperature of 80° C. to 150° C.

The topcoat layer optionally used with the multi-layer coating of the present invention can be a clear topcoat layer. As used herein, a "clear coating layer" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clear topcoat layer can comprise colorants, such as pigments, provided that the colorants do not interfere with the desired transparency of the clear topcoat layer. Alternatively, the clear topcoat layer is free of colorants such as pigments (i.e., unpigmented).

Non-limiting examples of topcoat layers that can be used with the multi-layer coating of the present invention include those described in U.S. Pat. No. 4,650,718 at col. 1 line 62 to col. 10 line 16; U.S. Pat. No. 5,814,410 at col. 2 line 23 to col. 9 line 54; and U.S. Pat. No. 5,891,981 at col. 2 line 22 to col. 12 line 37, all of which are incorporated by reference herein. Suitable topcoat coating compositions that can be used to form the topcoat layer also include those commercially available from PPG Industries, Inc. under the tradenames NCT®, DIAMOND COAT®, and CERAMICLEAR®.

The multi-layer coating according to the present invention can also comprise other optional layers including, but not limited to, additional basecoat layers as well as a primer coating layer as indicated above. As used herein, a "primer coating layer" refers to an undercoating that may be deposited onto a substrate in order to prepare the surface for application of a protective or decorative coating system. The primer coating layer can be formed over at least a portion of the substrate and the first or second basecoat layer can be formed over at least a portion of the primer coating layer. Further, the additional basecoat layers can be prepared from any of the core-shell particles and other materials previously described. The additional basecoat layers can be applied, for example, over the first or second basecoat layer before applying the topcoat layer.

The primer coating layer optionally used with the multi-layer coating of the present invention can be formed from a coating composition that comprises a film-forming resin such as a cationic based resin, an anionic based resin, and/or any of the additional film-forming resins previously described. The coating composition used to form the primer coating composition can also include the previously described crosslinkers, colorants, and other optional materials.

Additionally, the primer coating composition can include a corrosion inhibitor. As used herein, a "corrosion inhibitor" refers to a component such as a material, substance, compound, or complex that reduces the rate or severity of corrosion of a surface on a metal or metal alloy substrate. The corrosion inhibitor can include, but is not limited to, an alkali metal component, an alkaline earth metal component, a transition metal component, or combinations thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), Chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

The components of the primer coating composition can be selected to form an electrodepositable coating composition. An "electrodepositable coating composition" refers to a coating composition that is capable of being deposited onto an electrically conductive substrate under the influence of an applied electrical potential. Non-limiting examples of electrodepositable coating compositions include conventional anionic and cationic electrodepositable coating compositions, such as epoxy or polyurethane-based coatings. Suitable electrodepositable coatings are disclosed in U.S. Pat. No. 4,933,056 at col. 2 line 48 to col. 5 line 53; U.S. Pat. No. 5,530,043 at col. 1 line 54 to col. 4 line 67; U.S. Pat. No. 5,760,107 at col. 2 line 11 to col. 9 line 60; and U.S. Pat. No. 5,820,987 at col. 3 line 48 to col. 10 line 63, all of which are incorporated by reference herein. Suitable electrodepositable coating compositions also include those commercially available from PPG Industries, Inc. such as ED 6280, ED 6465, and ED 7000, for example.

As indicated, the primer coating composition can be deposited directly over at least a portion of a substrate before application of the first or second basecoat composition and dehydrated and/or cured to form the primer coating layer. The primer coating composition of the present invention can be applied by any means standard in the art, such as electrocoating, spraying, electrostatic spraying, dipping, rolling, brushing, and the like. Once the primer coating composition is applied to at least a portion of the substrate, the composition can be dehydrated and/or cured to form the primer coating layer. The primer coating composition can be dehydrated and/or cured, for example, at a temperature of 175° C. to 205° C. to form the primer coating layer.

It was found that the multi-layer coatings of the present invention can be formed at lower dehydration/cure temperatures than those typically required in other coatings commonly applied to automotive substrates. The multi-layer coatings also eliminate solvent migration between layers and the need of a primer-surfacer layer. As such, the multi-layer coatings of the present invention help reduce costs, eliminate the amount of coating equipment, and speed up the overall coating process.

In some examples, the multi-layer coating is applied over a substrate by: forming a first basecoat layer over at least a portion of a substrate by depositing a first basecoat composition directly onto at least a portion of the substrate; and forming a second basecoat layer over at least a portion of the first basecoat layer by depositing a second basecoat composition directly onto at least a portion of: (1) the first basecoat layer after the first basecoat composition is dehydrated and/or cured; or (2) the first basecoat composition before the first basecoat composition is dehydrated and/or cured. The first and second basecoat compositions can be dehydrated and/or cured separately or simultaneously at ambient temperatures (e.g. 20° C.) to 140° C., or from ambient temperatures to 120° C., or from ambient temperatures to 100° C., or from ambient temperatures to 90° C., or from 40° C. to 80° C., or from 50° C. to 80° C. Optionally, a topcoat layer is formed over at least a portion of the second basecoat layer by depositing a topcoat composition directly onto at least a portion of the second basecoat layer.

The substrate can optionally comprise a primer coating layer and the first basecoat layer is applied over at least a portion of the primer coating layer by depositing a first basecoat composition directly onto at least a portion of the primer coating layer. The primer coating layer can be formed by depositing a primer coating composition, such as by electrodepositing an electrodepositable coating composition, onto at least a portion of the substrate prior to depositing the first basecoat composition.

The multi-coatings can be applied to any kind of substrate as described above, such as for example to automotive parts in an automotive assembly plant. In some examples, during application of the multi-layer coating in an automotive assembly plant, a metal substrate is, optionally, first passed to an electrodeposition station where the primer coating composition is electrodeposited over the metal substrate and dehydrated and/or cured. The first basecoat composition is then directly applied over the electrodeposited coating layer or, alternatively, directly applied over at least a portion of the substrate in a basecoat zone comprising one or more coating stations. The basecoat zone can be located downstream of and adjacent to an electrodeposition oven. The first basecoat station has one or more conventional applicators, e.g., bell or gun applicators, connected to or in flow communication with a source of the first basecoat composition. The first basecoat composition can be applied, e.g., sprayed, over the substrate by one or more applicators at the first basecoat station in one or more spray passes to form a first basecoat layer over the substrate.

The first basecoat can be dehydrated and/or cured with a conventional drying device, such as an oven, located downstream of and/or adjacent to the second coating station and/or the first coating station. After applying the second basecoat composition, the second basecoat layer can be dehydrated and/or cured separately if the first basecoat layer has been previously dehydrated and/or cured. Alternatively, when the second basecoat composition is applied wet-on-wet to the first basecoat composition, both basecoat compositions can be simultaneously dehydrated and/or cured. It is appreciated that a similar process can be conducted with the second basecoat composition being applied before the first basecoat composition.

After the first basecoat composition and second basecoat composition have been dehydrated and/or cured, one or more conventional topcoat layers can be applied over the basecoat layer(s) at a topcoat station. The topcoat station includes one or more conventional applicators, e.g., bell applicators, connected to and in flow communication with a source of the topcoat composition. An oven is located downstream of and/or adjacent to the topcoat station to dehydrate and/or cure the topcoat composition.

A non-limiting example of an automotive assembly plant for applying a multi-layer coating is described in U.S. Pat.

No. 8,846,156 at col. 3 line 1 to col. 4 line 43 and FIG. 1, which is incorporated by reference herein.

In view of the foregoing the present invention relates in particular, without being limited thereto, to the following aspects:

Aspect 1: An aqueous dispersion comprising an aqueous medium and self-crosslinkable core-shell particles dispersed in the aqueous medium, wherein the core-shell particles comprise (1) a polymeric core at least partially encapsulated by (2) a polymeric shell comprising urethane linkages, keto and/or aldo functional groups, and hydrazide functional groups, and wherein the polymeric core is covalently bonded to at least a portion of the polymeric shell.

Aspect 2: The aqueous dispersion of aspect 1, wherein the polymeric core of the self-crosslinkable core-shell particles comprises an addition polymer derived from ethylenically unsaturated monomers.

Aspect 3: The aqueous dispersion of aspect 2, wherein the ethylenically unsaturated monomers comprise a (meth)acrylate monomer, a vinyl monomer, or a combination thereof.

Aspect 4: The aqueous dispersion of any one of the preceding aspects 1 to 3, wherein the polymeric shell of the self-crosslinkable core-shell particles further comprises at least one water dispersible group.

Aspect 5: The aqueous dispersion of aspect 4, wherein the at least one water dispersible group is selected from carboxylic acid functional groups, salts thereof and/or polyoxyalkylene groups.

Aspect 6: The aqueous dispersion of any one of the preceding aspects 1 to 5, wherein the self-crosslinkable core-shell particles are formed from a mixture of reactants comprising: (a) isocyanate-functional ethylenically unsaturated polyurethane prepolymers; (b) a Michael addition reaction product of ethylenically unsaturated monomers comprising a keto and/or aldo functional group, and a compound comprising at least two amino groups; (c) a hydrazide functional component; and (d) ethylenically unsaturated monomers.

Aspect 7: The aqueous dispersion of any one of the preceding aspects 1 to 6, wherein the polymeric shell of the self-crosslinkable core-shell particles comprises pendant keto and/or aldo functional groups.

Aspect 8: The aqueous dispersion of any one of the preceding aspects 1 to 7, wherein the polymeric core of the self-crosslinkable core-shell particles is completely free of keto and/or aldo functional groups.

Aspect 9: A coating composition comprising the aqueous dispersion according to any one of the preceding aspects 1 to 8.

Aspect 10: The coating composition of aspect 9, further comprising non-self-crosslinkable core-shell particles.

Aspect 11: The coating composition of aspect 10, wherein the non-self-crosslinkable core-shell particles comprise (1) a polymeric core comprising keto and/or aldo functional groups that is at least partially encapsulated by (2) a polymeric shell comprising urethane linkages, and wherein the polymeric core is covalently bonded to at least a portion of the polymeric shell.

Aspect 12: The coating composition of any one of aspects 10 or 11, wherein the non-self-crosslinkable core-shell particles are completely free of hydrazide functional groups.

Aspect 13: The coating composition of any one of the preceding aspects 9 to 12, further comprising a film-forming resin that is different from the core-shell particles.

Aspect 14: The coating composition of any one of the preceding aspects 10 to 13, further comprising at least one crosslinker that is reactive with at least one of the non-self-crosslinkable core-shell particles and the film-forming resin, if present.

Aspect 15: The coating composition of aspect 14, wherein the crosslinker is selected from a polyhydrazide, a carbodiimide, or a combination thereof.

Aspect 16: A multi-layer coating comprising: a substrate; a first basecoat layer formed from a first basecoat composition, wherein the first basecoat composition is a coating composition as defined in any one of preceding aspects 9 to 15; a second basecoat layer formed from a second basecoat composition comprising an aqueous medium and non-self-crosslinkable core-shell particles and a polyhydrazide dispersed in the aqueous medium, wherein the non-self-crosslinkable core-shell particles comprise (1) a polymeric core comprising keto and/or aldo functional groups that is at least partially encapsulated by (2) a polymeric shell comprising urethane linkages, wherein the polymeric core of the core-shell particles of the second basecoat composition is covalently bonded to at least a portion of the polymeric shell of the core-shell particles of the second basecoat composition, and, and wherein: (i) the first basecoat layer is formed over at least a portion of the substrate and the second basecoat layer is formed over at least a portion of the first coating layer; or (ii) the second basecoat layer is formed over at least a portion of the substrate and the first basecoat layer is formed over at least a portion of the second basecoat layer.

Aspect 17: The multi-layer coating of aspect 16, further comprising a primer coating layer directly applied over at least a portion of the substrate, wherein the primer coating layer is positioned between the first or second basecoat layer and the substrate.

Aspect 18: The multi-layer coating of any one of aspects 16 or 17, wherein the polymeric core of the core-shell particles of the first basecoat composition and the second basecoat composition each independently comprise an addition polymer derived from ethylenically unsaturated monomers comprising a (meth)acrylate monomer, a vinyl monomer, or a combination thereof.

Aspect 19: The multi-layer coating of any one of aspects 16 to 18, wherein the polymeric shell of the core-shell particles of the first basecoat composition and the second basecoat composition each independently comprise carboxylic acid functional groups and/or salts thereof.

Aspect 20: The multi-layer coating of any one of aspects 16 to 19, wherein the first basecoat composition and the second basecoat composition each independently further comprise a carbodiimide dispersed in the aqueous medium.

Aspect 21: The multi-layer coating of any one of aspects 16 to 20, wherein the non-self-crosslinkable core-shell particles of the first basecoat composition, if any, and the second basecoat composition are completely free of hydrazide functional groups.

Aspect 22: The multi-layer coating of any one of aspects 16 to 21, further comprising a topcoat layer applied over at least a portion of the first or second basecoat layer.

Aspect 23: The multi-layer coating of any of aspects 16 to 22, wherein the first basecoat composition and the second basecoat composition comprise at least one pigment.

Aspect 24: The multi-layer coating of aspect 23, wherein the first basecoat composition comprises at least one pigment that imparts a continuous unchanging color and the second basecoat composition comprises at least one special effect pigment.

Aspect 25: A substrate at least partially coated with a coating formed from the coating composition of any one of aspects 9 to 15 or with a multi-layer coating according to any one of aspects 16 to 24.

It is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" coating, "a" core-shell particle, and the like refer to one or more of any of these items.

The following examples are presented to demonstrate the general principles of the invention. The invention should not be considered as limited to the specific examples presented. All parts and percentages in the examples are by weight unless otherwise indicated.

EXAMPLE 1

Preparation of a Latex Having
Non-Self-Crosslinkable Core-Shell Particles

Part A: A polyurethane was first prepared by charging the following components in order into a four necked round bottom flask fitted with a thermocouple, mechanical stirrer, and condenser: 270 grams of butyl acrylate, 213.84 grams of hydroxyethyl methacrylate (HEMA), 4.1 grams of 2,6-di-tert-butyl 4-methyl phenol, 2.1 grams of triphenyl phosphite, 2.1 grams of dibutyl tin dilaurate, 1093.5 grams of polytetrahydrofuran with a number average molecular weight of 1000 g/mol, 242.5 grams of dimethylol propionic acid (DMPA), and 10.8 grams of triethylamine. The mixture was heated to 90° C. and held for 15 minutes. Next, 636.0 grams of isophorone diisocyanate was then charged into the flask over 90 minutes. After adding the isocyanate, the isocyanate adding funnel was rinsed with 54 grams of butyl acrylate. The mixture was held at 90° C. until all of the isocyanate infrared peaks were gone. Once the infrared peaks were gone, 1215 grams of butyl acrylate were charged into the flask, and cooled to ambient temperature. The resulting polyurethane had an acid value of 25.9 mg KOH/g, and a weight average molecular weight of 6,953 g/mol. The weight average molecular weight was determined by gel permeation chromatography versus a polystyrene standard with tetrahydrofuran as the mobile phase. The acid value was measured by titration with 0.1N KOH solution.

Part B: A latex comprising polyurethane-acrylic core-shell particles with keto functionality on the acrylic core and pendant carboxylic acid functionality on the polyurethane shell was prepared by charging the following components in order into a four necked round bottom flask fitted with a thermocouple, mechanical stirrer, and condenser: 4500 grams of deionized water, 67.3 grams of AEROSOL® OT-75 (surfactant, commercially available from Cytec), 25.4 grams of Reasoap SR-10 (reactive emulsifier, commercially available from Adeka Corp.), 73.7 grams of dimethyl ethanolamine, 1713 grams of the polyurethane prepared in Part A, 437 grams of methyl methacrylate, 252 grams of diacetone acrylamide, and 168 grams of hexanediol diacrylate. The mixture was heated to 36° C. and held for 30 minutes with a $N_2$ blanket. A mixture of 5.8 grams of t-butylhydroperoxide and 126 grams of deionized water was then charged into the flask and mixed for 15 minutes. Next, a mixture of 0.06 grams of ferrous ammonium sulfate, 3.2 grams of sodium metabisulfite, and 126 grams of deionized water was charged into the flask over 30 minutes. After peak exotherm, the system was held at 65° C. for one hour. Once the mixture was cooled to 45° C., 29.5 grams of ACTI-CIDE® MBS (microbiocide formed of a mixture of 1,2-benzisothiazolin-3-one and 2-methyl-4-isothiazolin-3-one, commercially available from Thor GmbH), 1.5 grams of FOAMKILL® 649 (non-silicone defoamer, commercially available from Crucible Chemical Company), and 13 grams of deionized water were charged into the flask and mixed for 15 minutes. The resulting latex had a solid content of 37.1% and an average particle size of 122 nanometers (nm). The average particle size was determined with a Zetasizer 3000HS following the instructions in the Zetasizer 3000HS manual.

EXAMPLE 2

Preparation of a Latex having Self-Crosslinkable
Core-Shell Particles

Part A: A polyurethane was first prepared by charging the following components in order into a four necked round bottom flask fitted with a thermocouple, mechanical stirrer, and condenser: 113 grams of butyl acrylate, 8.7 grams of hydroxyethyl methacrylate (HEMA), 0.7 grams of 2,6-di-tert-butyl 4-methyl phenol, 90.9 grams of FOMREZ® 66-56 (hydroxyl terminated saturated linear polyester polyol, commercially available from Chemtura), 90.9 grams of POLYMEG® 2000 polyol (polytetramethylene ether glycol, commercially available from LyondellBasell), 30 grams of dimethylol propionic acid (DMPA), and 1.3 grams of triethylamine. The mixture was heated to 50° C. and held for 15 minutes. After heating the mixture, 123.0 grams of isophorone diisocyanate was charged into the flask over 10 minutes and mixed for 15 minutes. Next, 8.2 grams of butyl acrylate and 0.34 grams of dibutyl tin dilaurate (DBTDL)

was charged into the flask. Immediate exotherm was observed. After exotherm subsided, the mixture was heated to 90° C. and held for 60 minutes. The NCO equivalent weight was measured to be 1326. The mixture was then cooled to 70° C., and 113.0 grams of butyl methacrylate and 23.5 grams of hexanediol diacrylate were charged into the flask. The mixture was kept at 60° C. before being dispersed into water.

Part B: A latex comprising polyurethane-acrylic core-shell particles with urea linkages and urethane linkages and carboxylic acid functionality, keto functionality, and hydrazide functionality on the polyurethane shell was prepared by first charging the following components into a four necked round bottom flask fitted with a thermocouple, mechanical stirrer, and condenser: 480 grams of deionized water, 5.3 grams of diacetone acrylamide, 18.3 grams of dimethyl ethanolamine, and 6.0 grams of ethylenediamine. The mixture was heated to 70° C. and held for two hours with an $N_2$ blanket. After heating the mixture, 21.3 grams adipic dihydrazide, 8.0 grams AEROSOL® OT-75 (surfactant, commercially available from Cytec) and 350 grams of deionized water charged into the flask and held at 50° C. for 15 minutes. Next, 520 grams of the polyurethane prepared in part A was dispersed into the flask over 20 minutes and mixed for an additional 15 minutes. A mixture of 1.0 gram of ammonium persulfate, 1.0 gram of 35% hydrogen peroxide, and 30 grams of deionized water was charged into the flask. The temperature rose from 50° C. to 74° C. due to polymerization exotherm. The mixture was then held at 70° C. for an additional hour. After being cooled to 40° C., 0.2 grams of FOAMKILL® 649 (non-silicone defoamer, commercially available from Crucible Chemical Company), 4.7 grams of ACTICIDE® MBS (microbiocide formed of a mixture of 1,2-benzisothiazolin-3-one and 2-methyl-4-isothiazolin-3-one, commercially available from Thor GmbH), and 11 grams of deionized water were charged and mixed for an additional 15 minutes. The resulting latex had a solid content of 38.6%.

COMPARATIVE EXAMPLE 3

Preparation of a Latex having Core-Shell Particles

Part A: A polyurethane was first prepared by charging the following components in order into a four necked round bottom flask fitted with a thermocouple, mechanical stirrer, and condenser: 134.5 grams of butyl acrylate, 10.3 grams of hydroxyethyl methacrylate (HEMA), 0.8 grams of 2,6-di-tert-butyl 4-methyl phenol, 108.2 grams of FOMREZ® 66-56 (hydroxyl terminated saturated linear polyester polyol, commercially available from Chemtura), 108.2 grams of POLYMEG® 2000 polyol (polytetramethylene ether glycol, commercially available from LyondellBasell), 32 grams of dimethyol propionic acid (DMPA), and 1.6 grams of triethylamine. The mixture was heated to 50° C. and held for 15 minutes. After heating the mixture, 135.0 grams of isophorone diisocyanate was charged into the flask over 10 minutes and mixed for 15 minutes. Next, 9.7 grams of butyl acrylate and 0.40 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 134.5 grams of butyl methacrylate and 19.8 grams of hexanediol diacrylate were charged into the flask. The mixture was kept at 60° C. before being dispersed into water.

Part B: A latex comprising polyurethane-acrylic core-shell particles with urea linkages and urethane linkages and with keto functionality on the acrylic core and carboxylic acid and hydrazide functionality on the polyurethane shell was prepared by first charging the following components into a four necked round bottom flask fitted with a thermocouple, mechanical stirrer, and condenser: 1000 grams of deionized water, 20 grams of dimethyl ethanolamine, 4.5 grams of ethylenediamine, and 10 grams AEROSOL® OT-75 (surfactant, commercially available from Cytec). The mixture was heated to 50° C. with an $N_2$ blanket. After heating the mixture, 26.4 grams adipic dihydrazide was charged into the flask and mixed for five minutes. Next, 650 grams of the polyurethane prepared in part A was dispersed into the flask over 20 minutes and mixed for an additional 15 minutes, followed by 25.0 g of diacetone acrylamide and held for 15 minutes. A mixture of 1.0 gram of ammonium persulfate, 3.5 grams of 35% hydrogen peroxide, and 60 grams of deionized water was charged into the flask. The temperature rose from 50° C. to 71° C. due to polymerization exotherm. The mixture was then held at 70° C. for an additional hour. After being cooled to 40° C., 0.2 grams of FOAMKILL® 649 (non-silicone defoamer, commercially available from Crucible Chemical Company), 5.8 grams of ACTICIDE® MBS (microbiocide formed of a mixture of 1,2-benzisothiazolin-3-one and 2-methyl-4-isothiazolin-3-one, commercially available from Thor GmbH), and 14 grams of deionized water were charged and mixed for an additional 15 minutes. The resulting latex had a solid content of 36.4%.

EXAMPLES 4-5

Preparation of Basecoat Compositions

Two separate basecoat compositions were prepared with the polyurethane-acrylic core-shell particles previously described. Each basecoat composition was prepared with the components listed in Table 1.

TABLE 1

| Components | Example 4 Parts by Weight (grams) | Comp. Example 5 Parts by Weight (grams) |
|---|---|---|
| Latex of Example 2 | 149.72 | 0.00 |
| Latex of Comparative Example 3 | 0.00 | 158.76 |
| Latex of Example 1 | 13.59 | 13.59 |
| Adipic acid dihydrazide | 0.18 | 0.18 |
| Polyester resin[1] | 100.00 | 100.00 |
| CARBODILITE ® V-02-L2[2] | 10.00 | 10.00 |
| BYK ® 348[3] | 0.26 | 0.26 |
| BYK ® 032[4] | 1.92 | 1.92 |
| Deionized water | 77.41 | 58.46 |
| Extender Tint[5] | 48.25 | 48.25 |
| White Tint[6] | 33.13 | 33.13 |
| Yellow Tint[7] | 8.00 | 8.00 |
| Black Tint[8] | 21.36 | 21.36 |
| BYKETOL ® WS[9] | 9.00 | 9.00 |
| SURFYNOL ® 104E[10] | 4.00 | 4.00 |
| Isopropanol | 9.00 | 9.00 |
| TALCRON ® MP1052[11] | 4.00 | 4.00 |

TABLE 1-continued

| Components | Example 4 Parts by Weight (grams) | Comp. Example 5 Parts by Weight (grams) |
|---|---|---|
| N-Butoxypropanol | 10.00 | 10.00 |
| 59% DMEA[9] | 0.30 | 0.46 |

[1]Polyester resin prepared according to Example 9 of U.S. Pat. No. 6,762,240, which is incorporated by reference herein. The acid groups of the polyester were 100% neutralized with dimethyl ethanol amine. The polyester was diluted to 20 wt. % solids with water before use.
[2]Waterborne carbodiimide crosslinker with a hydrophilic segment, commercially available from GSI Exim America, Inc.
[3]Polyether modified siloxane, commercially available from Byk.
[4]Emulsion of paraffin-based mineral oils and hydrophobic components, commercially available from Byk.
[5]Extender tint paste consisting of 61 wt. % barium sulfate dispersed in 10 wt. % acrylic polymer and having a solids content of 71 wt. %.
[6]White tint paste consisting of 61 wt. % $TiO_2$ dispersed in 9 wt. % acrylic polymer blend and having a solids content of 70 wt. %.
[7]Yellow tint paste consisting of 25 wt. % yellow iron oxide dispersed in 21 wt. % acrylic polymer and having a solids content of 46 wt. %.
[8]Black tint paste consisting of 6 wt. % carbon black dispersed in 18 wt. % acrylic polymer and having a solids content of 24 wt. %.
[9]Silicone-free surface additive, commercially available from Byk.
[10]Surfactant, commercially available from Air Products.
[11]Magnesium silicate, commercially available from Barretts Minerals.
[12]Dimethyl ethanolamine 59 wt. % aqueous solution.

The components listed in Table 1 were mixed with a conventional stir blade while preventing foaming and air entrapment.

EXAMPLE 6

Preparation of a Basecoat Composition

A basecoat composition was prepared with the components listed in Table 2.

TABLE 2

| Component | Part by Weight (grams) |
|---|---|
| Latex of Example 1 | 251.98 |
| Adipic acid dihydrazide | 3.27 |
| CARBODILITE ® V-02-L2[1] | 10.00 |
| BYK ® 348[2] | 0.23 |
| Odorless mineral spirits[13] | 3.76 |
| 2-ethylhexanol | 12.38 |
| Deionized water | 108.06 |
| LAPONITE ® RD[14] | 0.91 |
| Butyl CARBITOL ™[15] | 10.00 |
| Aluminum paste[16] | 31.43 |
| Aluminum passivator[17] | 10.11 |
| 50% DMEA[18] | 0.40 |

[13]Organic solvent, commercially available from Shell Chemical Co.
[14]Sodium lithium magnesium layered silicate, commercially available from Byk.
[15]Diethylene glycol monobutyl ether, commercially available from Dow.
[16]TSB 2180A aluminum paste, commercially available from Toyal America.
[17]A 60/36/4 w/w solution of LUBRIZOL 2062/diisopropanolamine/Propylene glycol Butyl ether LUBRIZOL 2062, commercially available from the Lubrizol Co.
[18]Dimethyl ethanolamine 50 wt. % aqueous solution.

The components listed in Table 2 were mixed with a conventional stir blade while preventing foaming and air entrapment.

EXAMPLES 7-10

Preparation and Evaluation of Multi-Layer Coatings

Various multi-layer coatings having two separate basecoats were prepared with the components and final baking temperature listed in Table 3.

TABLE 3

| Multi-layer Coating Example No. | Composition used to form First Basecoat | Composition used to form Second Basecoat | Final Bake Temperature (° C.) |
|---|---|---|---|
| 7 | Example 4 | Example 6 | 80 |
| 8 | Comp. Example 5 | Example 6 | 80 |
| 9 | Example 4 | Example 6 | 100 |
| 10 | Comp. Example 5 | Example 6 | 100 |

Each multi-layer coating was prepared by spraying their respective first and second basecoat compositions over 4 inch by 12 inch steel panels that were pre-coated with an ED 6465 electrocoat (an electrocoat commercially available from PPG). The basecoats compositions were applied under controlled environmental conditions of 70-75° F. and 50-60% relative humidity. Further, the first basecoat compositions of each multi-layer coating were independently applied in two coats with a 60 second flash at ambient temperature between the coats and then flashed at ambient temperature for five minutes. The film thickness of the first basecoats were within a range of from 0.5-0.7 mils. Next, the second basecoat compositions of each multi-layer coating were applied in two coats over the first basecoats, without a 90 second flash between coats, and then flashed at ambient temperature for five minutes and then dehydrated for five minutes at 80° C. The film thickness of the second basecoats were within a range of from 0.5-0.6 mils.

After forming the basecoat layers, a 2K isocyanate cured clearcoat was applied over the basecoated panels in two coats without a flash between coats. The coated panels were allowed to flash for 10 minutes at ambient conditions and baked for 30 minutes at the baking temperature identified in Table 3 (i.e. 80° C. or 100° C.). The dry film thickness of the clearcoats were within a range of from 1.8-2.0 mils.

Appearance and physical properties of the resulting multi-layered coatings are listed in Table 4.

TABLE 4

| Multi-layer Coating Example No. | Flop Index[19] | Adhesion[20] | Adhesion after 1 hr[21] | Adhesion after 24 hr[21] |
|---|---|---|---|---|
| 7 | 13.6 | 5 | 2 | 5 |
| 8 | 12.9 | 5 | 1 | 5 |
| 9 | N/A | 5 | 4 | 5 |
| 10 | N/A | 5 | 2 | 5 |

[19]A measure of the change in lightness of the metallic color as the coating is tilted through the entire range of viewing angles. The flop index was measured with a BYK Wavescan Dual instrument (manufactured by BYK) following the instructions of the BYK Wavescan instrument manual. Higher flop index values are more desirable.
[20]Adhesion was determined in accordance with ASTM D3359-09e2. The adhesion results were reported on a scale of 0 to 5 with 0 as the worst and 5 as the best.
[21]The panels were subjected to a 10 day humidity resistance test similar to ASTM D1735-92 that was conducted in a Harshaw Equipment GS "Uni-Fog" corrosion test cabinet set at 100° F. and 100% relative humidity. The adhesion of the panels were then determined in accordance with ASTM D3359-09e2 after one hour and 24 hours following completion of the test. The adhesion results were reported on a scale of 0 as the worst to 5 as the best.

Whereas particular embodiments of this invention have been described above for purposes of illustration, it will be evident to those skilled in the art that numerous variations of the details of the present invention may be made without departing from the invention as defined in the appended claims.

The invention claimed is:
1. An aqueous dispersion comprising an aqueous medium and self-crosslinkable core-shell particles dispersed in the aqueous medium, wherein the core-shell particles comprise (1) a polymeric core at least partially encapsulated by (2) a polymeric shell comprising urethane linkages, keto and/or aldo functional groups, and hydrazide functional groups, and
wherein the polymeric core is covalently bonded to at least a portion of the polymeric shell, and
wherein the self-crosslinkable core-shell particles are formed from a mixture of reactants comprising: (a) isocyanate-functional ethylenically unsaturated polyurethane prepolymers; (b) a Michael addition reaction product of ethylenically unsaturated monomers comprising a keto and/or aldo functional group, and a compound comprising at least two amino groups; (c) a hydrazide functional component; and (d) ethylenically unsaturated monomers.

2. The aqueous dispersion of claim 1, wherein the polymeric core of the self-crosslinkable core-shell particles comprises an addition polymer derived from ethylenically unsaturated monomers.

3. The aqueous dispersion of claim 2, wherein the ethylenically unsaturated monomers comprise a (meth)acrylate monomer, a vinyl monomer, or a combination thereof.

4. The aqueous dispersion of claim 1, wherein the polymeric shell of the self-crosslinkable core-shell particles further comprises at least one water dispersible group.

5. The aqueous dispersion of claim 4, wherein the at least one water dispersible group is selected from carboxylic acid functional groups, salts thereof and/or polyoxyalkylene groups.

6. The aqueous dispersion of claim 1, wherein the polymeric shell of the self-crosslinkable core-shell particles comprises pendant keto and/or aldo functional groups.

7. The aqueous dispersion of claim 1, wherein the polymeric core of the self-crosslinkable core-shell particles is completely free of keto and/or aldo functional groups.

8. A coating composition comprising the aqueous dispersion according to claim 1.

9. The coating composition of claim 8, further comprising non-self-crosslinkable core-shell particles.

10. The coating composition of claim 9, wherein the non-self-crosslinkable core-shell particles comprise (1) a polymeric core comprising keto and/or aldo functional groups that is at least partially encapsulated by (2) a polymeric shell comprising urethane linkages, and
wherein the polymeric core is covalently bonded to at least a portion of the polymeric shell.

11. The coating composition of claim 10, wherein the non-self-crosslinkable core-shell particles are completely free of hydrazide functional groups.

12. The coating composition of claim 9, further comprising a film-forming resin that is different from the core-shell particles.

13. The coating composition of claim 12, further comprising at least one crosslinker that is reactive with at least one of the non-self-crosslinkable core-shell particles and the film-forming resin.

14. The coating composition of claim 13, wherein the crosslinker is selected from a polyhydrazide, a carbodiimide, or a combination thereof.

15. A substrate at least partially coated with a coating formed from the coating composition of claim 8.

16. A multi-layer coating comprising:
a substrate;
a first basecoat layer formed from a first basecoat composition comprising an aqueous medium and self-crosslinkable core-shell particles dispersed in the aqueous medium, wherein the self-crosslinkable core-shell particles comprise (1) a polymeric core at least partially encapsulated by (2) a polymeric shell comprising urethane linkages, keto and/or aldo functional groups, and hydrazide functional groups; and
a second basecoat layer formed from a second basecoat composition comprising an aqueous medium and non-self-crosslinkable core-shell particles and a polyhydrazide dispersed in the aqueous medium, wherein the non-self-crosslinkable core-shell particles comprise (1) a polymeric core comprising keto and/or aldo functional groups that is at least partially encapsulated by (2) a polymeric shell comprising urethane linkages,
wherein the polymeric core of the core-shell particles of the first basecoat composition and the second basecoat composition are each independently covalently bonded to at least a portion of the polymeric shell of the core-shell particles, and
wherein: (i) the first basecoat layer is formed over at least a portion of the substrate and the second basecoat layer is formed over at least a portion of the first coating layer; or (ii) the second basecoat layer is formed over at least a portion of the substrate and the first basecoat layer is formed over at least a portion of the second basecoat layer.

17. The multi-layer coating of claim 16, further comprising a primer coating layer directly applied over at least a portion of the substrate, wherein the primer coating layer is positioned between the first or second basecoat layer and the substrate.

18. The multi-layer coating of claim 16, wherein the polymeric core of the core-shell particles of the first basecoat composition and the second basecoat composition each independently comprise an addition polymer derived from ethylenically unsaturated monomers comprising a (meth)acrylate monomer, a vinyl monomer, or a combination thereof.

19. The multi-layer coating of claim 16, wherein the polymeric shell of the core-shell particles of the first basecoat composition and the second basecoat composition each comprise carboxylic acid functional groups and/or salts thereof.

20. The multi-layer coating of claim 16, wherein the first basecoat composition and the second basecoat composition each independently further comprise a carbodiimide dispersed in the aqueous medium.

21. The multi-layer coating of claim 16, wherein the self-crosslinkable core-shell particles are formed from a mixture of reactants comprising: (a) isocyanate-functional ethylenically unsaturated polyurethane prepolymers; (b) a Michael addition reaction product of ethylenically unsaturated monomers comprising a keto and/or aldo functional group, and a compound comprising at least two amino groups; (c) a hydrazide functional component; and (d) ethylenically unsaturated monomers.

22. The multi-layer coating of claim 16, wherein the first basecoat composition further comprises non-self-crosslinkable core-shell particles.

23. The multi-layer coating of claim 22, wherein the non-self-crosslinkable core-shell particles of the first basecoat composition and the second basecoat composition are completely free of hydrazide functional groups.

24. The multi-layer coating of claim 16, wherein the first basecoat composition further comprises a film-forming resin that is different from the core-shell particles.

25. The multi-layer coating of claim 16, further comprising a topcoat layer applied over at least a portion of the first or second basecoat layer.

26. The multi-layer coating of claim 16, wherein the first basecoat composition and the second basecoat composition comprise at least one pigment.

27. The multi-layer coating of claim 26, wherein the first basecoat composition comprises at least one pigment that imparts a continuous unchanging color and the second basecoat composition comprises at least one special effect pigment.

28. The coating composition of claim 8, further comprising a (meth)acrylic resin.

29. An aqueous dispersion comprising an aqueous medium and self-crosslinkable core-shell particles dispersed in the aqueous medium, wherein the core-shell particles comprise (1) a polymeric core at least partially encapsulated by (2) a polymeric shell comprising urethane linkages, keto and/or aldo functional groups, and hydrazide functional groups,
- wherein the polymeric core is covalently bonded to at least a portion of the polymeric shell, and
- wherein the polymeric core of the self-crosslinkable core-shell particles is completely free of keto and/or aldo functional groups.

30. A coating composition comprising an aqueous dispersion comprising an aqueous medium and self-crosslinkable core-shell particles dispersed in the aqueous medium, wherein the core-shell particles comprise (1) a polymeric core at least partially encapsulated by (2) a polymeric shell comprising urethane linkages, keto and/or aldo functional groups, and hydrazide functional groups,
- wherein the polymeric core is covalently bonded to at least a portion of the polymeric shell, and
- wherein the coating composition further comprises non-self-crosslinkable core-shell particles, a (meth)acrylic resin, or a combination thereof.

31. The substrate of claim 15, wherein the substrate comprises a vehicle component.

32. The substrate of claim 15, wherein the substrate comprises a metallic component.

33. The substrate of claim 15, wherein the substrate comprises a non-metallic component comprising at least one of polyester, polyolefin, polyamide, cellulosic, polystyrene, polyacrylic, poly(ethylene naphthalate), polypropylene, polyethylene, nylon, ethylene vinyl alcohol, polylactic acid, poly(ethyleneterephthalate), polycarbonate, polycarbonate acrylobutadiene styrene, wood, veneer, wood composite, particle board, medium density fiberboard, cement, stone, glass, paper, cardboard, textiles, and leather.

* * * * *